Feb. 13, 1923.

J. C. JONES ET AL.
GRASS TRIMMER.
FILED MAR. 5, 1921.

INVENTORS
James C. Jones
Adolf C. Kreutzer
By W. W. Williamson
Atty

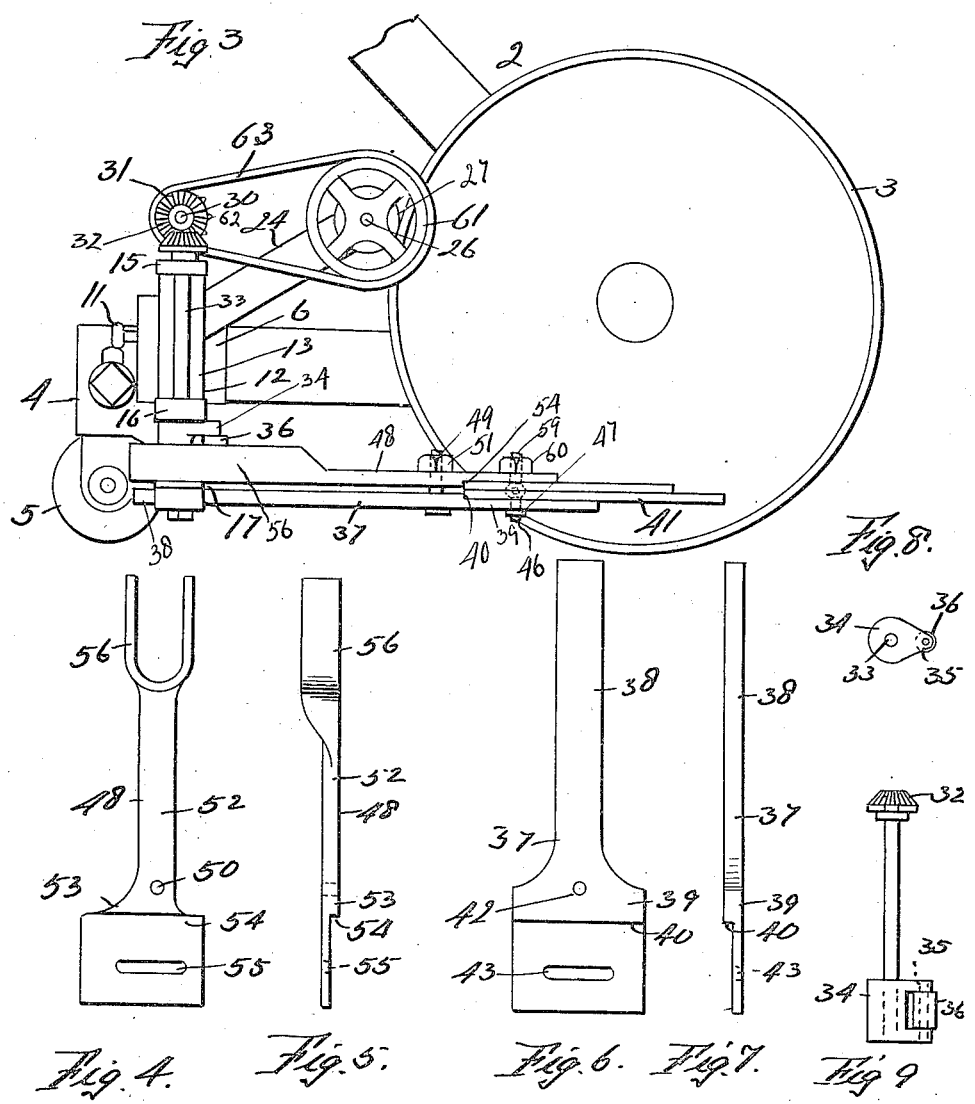

Feb. 13, 1923.
J. C. JONES ET AL.
GRASS TRIMMER.
FILED MAR. 5, 1921.
1,445,515.
3 SHEETS—SHEET 3.

INVENTORS
James C. Jones
Adolf C. Kreutzer
By W. W. Williamson
Atty

Patented Feb. 13, 1923.

1,445,515

UNITED STATES PATENT OFFICE.

JAMES C. JONES AND ADOLF C. KREUTZER, OF PHILADELPHIA, PENNSYLVANIA.

GRASS TRIMMER.

Application filed March 5, 1921. Serial No. 450,082.

*To all whom it may concern:*

Be it known that we, JAMES C. JONES and ADOLF C. KREUTZER, citizens of the United States, residing at Philadelphia, in the county of Philadelphia and State of Pennsylvania, have invented new and useful Improvements in Grass Trimmers, of which the following is a specification.

Our invention relates to new and useful improvements in grass trimmers, and has for its object to provide a device of this character for attachment to a lawn mower of ordinary construction, whereby it will be actuated by the said lawn mower and so arranged as to be easily detachable therefrom.

Another object of the invention is to provide a stationary serrated cutter bar which when in place is located adjacent and to one side of one of the lawn mower driving wheels and with which cooperates a reciprocating serrated cutter or blade, the latter receiving its motion through suitable power and motion transmitting means coacting with one of the driving wheels.

A further object of the invention is to provide means for attachment to the frame of a lawn mower and adapted to remain thereon whereby the grass trimmer may be readily placed on or removed from the lawn mower.

With these ends in view, this invention consists in the details of construction and combination of elements hereinafter set forth and then specifically designated by the claims.

In order that those skilled in the art to which this invention appertains, may understand how to make and use the same, we will describe its construction in detail, referring by numerals to the accompanying drawings forming a part of this application, in which:—

Fig. 3, is a similar view illustrating a slightly different driving or actuating means.

Fig. 4, is a face view of the supporting and operating lever of the cutting blade.

Fig. 5, is an edge view thereof.

Fig. 6, is a face view of the cutter bar support.

Fig. 7, is an edge view thereof.

Fig. 8, is a lower end view of the operating crank or cam and its shaft.

Fig. 9, is a side elevation thereof.

Figure 1:
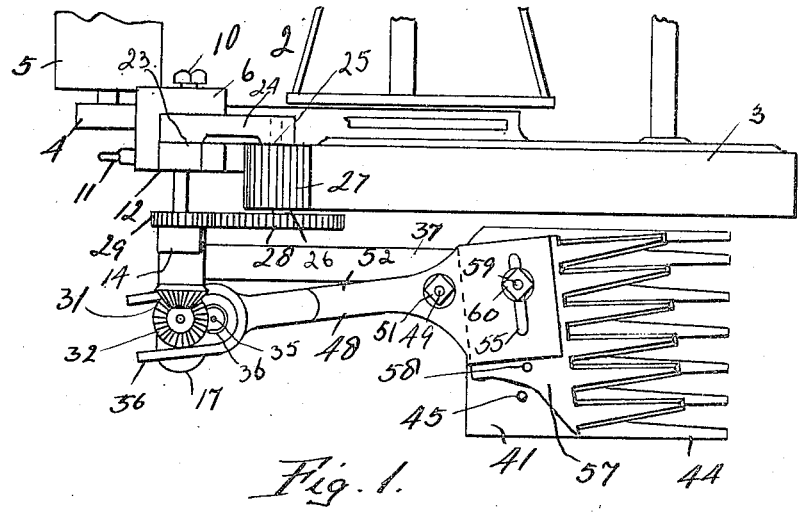
Fig. 1, is a fragmentary plan view of a lawn mower showing my grass trimmer attached thereto.
Figure 2:
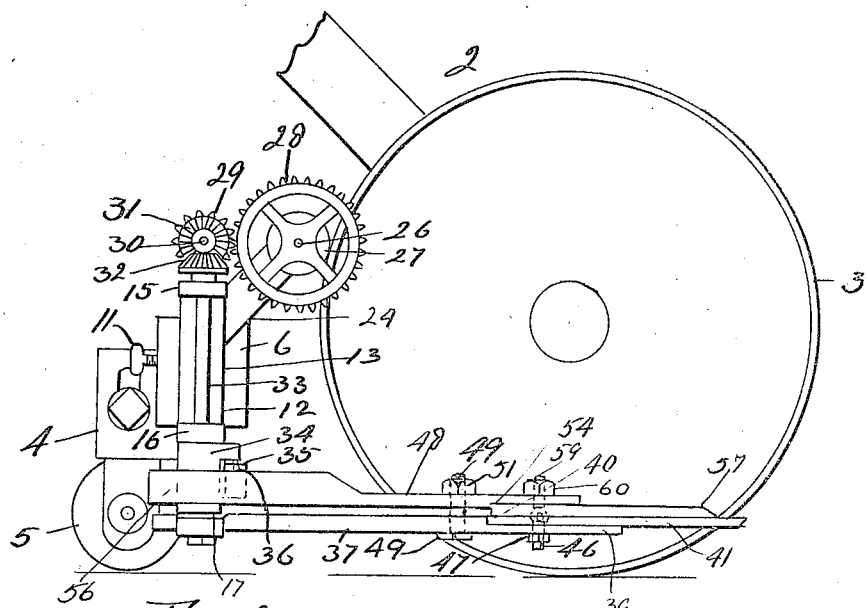
Fig. 2, is a side elevation thereof.
Figure 10:
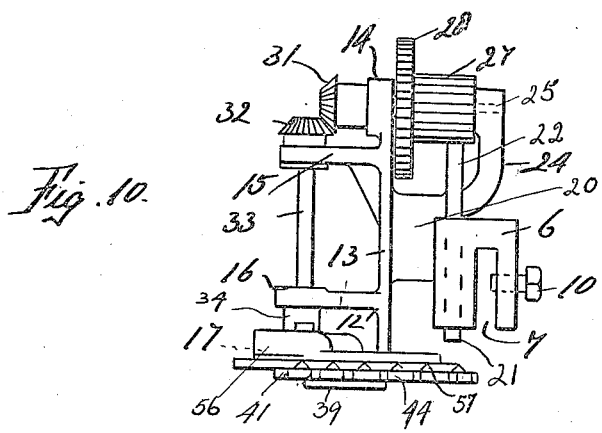
Fig. 10, is a front elevation of the complete grass trimmer detached and showing the attaching socket connected therewith.
Figure 11:
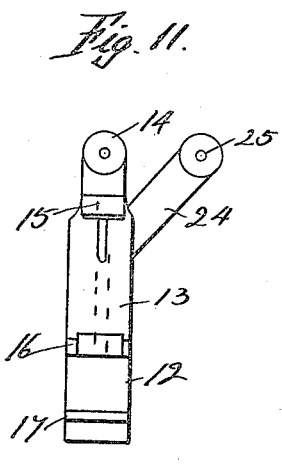
Fig. 11, is an outer edge view or side elevation of the trimmer frame.
Figure 12:
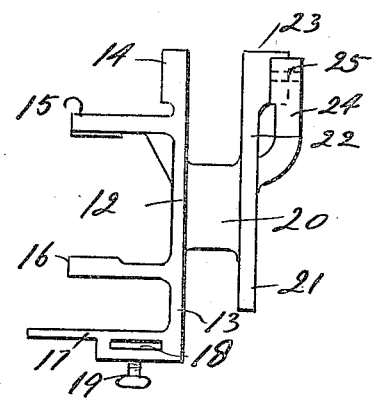
Fig. 12, is a front elevation thereof.
Figure 13:
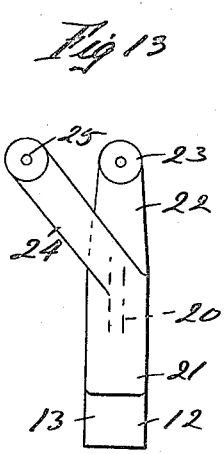
Fig. 13, is an inner edge view or side elevation thereof.
Figure 15:
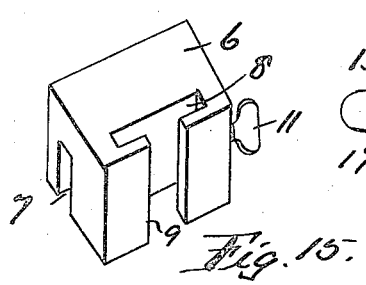
Fig. 15, is a perspective view of the attaching socket.
Figure 14:
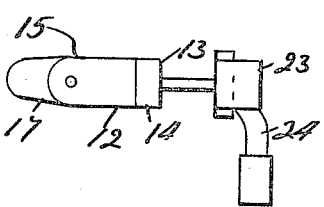
Fig. 14, is a plan view of said frame.

In carrying out our invention as here embodied, particular reference being had to Figs. 1 and 2, the numeral 2 represents a lawn mower of any ordinary or well known construction and including a tractor or driving wheel 3, the outer surface or circumference of which is preferably corrugated or roughened, a frame 4 and a balancing or supporting roller 5.

On some suitable part of the mower frame 4 is detachably and adjustably mounted the attaching socket 6 having a slot 7 for registration with a part of the mower frame and provided with a channel 8 formed by the spaced flanges 9 into which fits a suitable part of the trimmer to be hereinafter described. A set screw 10 or its equivalent is threaded through the body of the attaching socket in the region of the slot 7 so as to project into said slot and impinge against that portion of the mower frame lying within the slot and thereby detachably and adjustably fasten said attaching socket to the mower frame. A set screw 11 or its equivalent is threaded through the body of the attaching socket in the region of the channel 8 and projects into said channel for detachably fastening the trimmer frame to the attaching socket as will be hereinafter explained.

The frame 12 of the trimmer consists of an upright 13 having a bearing 14 at its upper end and integral spaced parallel bearing brackets 15 and 16 projecting outwardly intermediate the ends of said upright, one of said brackets being located adjacent the upper end of the upright and the other adjacent its lower end. Below the lower bracket 16 and formed integral with the upright is a foot 17 having a recess 18 therein, into which projects a set screw 19 or its equivalent, said screw being threaded into the underside of said foot. From the inner face of the upright projects a lug 20 with which is formed a downwardly projecting finger 21 for registration with the channel 8 in the attaching socket 6 and an upwardly projecting extension 22 provided with a bearing 23. The finger 21 and its extension 22 are spaced from and parallel with the upright 13 and with said finger is formed a forwardly and upwardly projecting arm 24 having a hole 25 at its outer end.

In the hole 25 is mounted or fitted a stationary axle 26 on which is revolubly journalled a wheel 27 the surface thereof preferably being corrugated or roughened and this wheel coacts with one of the wheels of the mower when the trimmer is in place thereon and is revolved by the mower wheel.

Connected with the wheel 27 is a gear 28 meshing with a pinion 29 secured on the shaft 30, the latter being journalled in the bearings 14 and 23 and on said shaft is also secured a beveled gear 31 meshing with a beveled gear 32 secured to the upper end of the vertical shaft 33 which is journalled in the bearing brackets 15 and 16. On the lower end of the shaft 33 is secured a cam yoke 34 between the arms of which is mounted an axle 35 having a cam roller 36 journalled thereon.

The reference numeral 37 denotes the cutter bar support comprising a shank 38 for insertion in the recess 18 where it is securely held, after adjustment, by the set screw 19 and a head 39 recessed in the upper face as at 40 for the reception of the cutter bar 41. This head is provided with a hole 42 and with a slot 43 in the recessed portion.

The cutter bar 41 is provided with forwardly extending fingers 44 which act as the fixed cutting element and is provided with a series of perforations 45 whereby the cutter bar may be adjusted within certain limits and should the adjustment thus attainable be insufficient the bar may be further adjusted within the limits of the slot 43, it being understood that suitable fastening means such as a screw 46 is employed to attach the cutter bar to its support, said fastening means passing through any one of the perforations and the slot with a nut 47 threaded thereon.

On the cutter bar support 37 is pivoted a cutting blade operating lever 48 by means of a bolt 49 or its equivalent passing through a hole 50 therein and through the hole 42 in the head of the cutter bar support, said bolt having a nut 51 screwed thereon.

The cutting blade lever 48 includes a shank 52 with a head 53 at one end recessed in its lower face as at 54 with a slot 55 in the recessed portion, the opposite end of the shank being bifurcated as represented by the numeral 56 so as to partially surround the yoke 34 and its cam roller 36 and be acted upon by said roller to oscillate the cutting blade operating lever.

A suitable serrated cutting blade 57 provided with a series of perforations 58 is adjustably attached to the cutting blade lever by means of a screw 59 passing through any one of said perforations and the slot 55 in the head of the cutting blade lever 48 with a nut 60 screwed thereon. The perforations 58 and slot 55 permit the cutting blade 57 to be adjusted relative to the operating lever 48 in the same manner as the cutting bar is adjusted relative to its support.

In practice the lawn mower is used in the ordinary manner for cutting the grass but as is well known the grass growing close to walls, buildings, fences and hedges or other plants cannot be cut with a lawn mower of ordinary construction making necessary to afterwards trim the uncut portions with a sickle or shears which is slow, tedious and tiring. These are disadvantages which are overcome by my improved trimmer, the latter being readily attached to the lawn mower by inserting the finger 21 in the attaching socket normally remaining in place on the lawn mower. When the trimmer has been attached to the lawn mower, said trimmer projects to one side of the mower beyond the wheel thereof and therefore can be guided along the fence, hedge or other object to trim the grass which was uncut by the mower. This makes it unnecessary for the person cutting the grass to use shears or other instruments and relieves the person of the necessity of stooping or kneeling upon the ground. As the lawn mower is moved over the ground the motion will be transmitted to the wheel 27 and from it to the cam yoke and its roller through the train of gearing which will oscillate the cutting blade over the cutter bar and thus accomplish the cutting or trimming operations.

In Fig. 3 we have shown a slightly different means of transmitting motion to the cutting blade which is especially adapted for use with lawn mowers having a long frame making it necessary to mount the trimmer a greater distance from the mower wheel than in the form shown in Figs. 1 and 2. In this case a sprocket wheel 61 is journalled on the axle 26 and connected with the wheel 27 while a smaller sprocket wheel 62 is secured to the shaft 30 in lieu of the pinion 29 and motion is transmitted from the sprocket wheel 61 to the sprocket wheel 62 by means of a chain 63 passing about said sprocket wheels. The rest of the construction is identical with that described for device shown in Figs. 1 and 2 and the operation is the same.

Of course we do not wish to be limited to the exact details of construction as herein shown as these may be varied within the limits of the appended claims without departing from the spirit of our invention.

Having thus fully described our invention, what we claim as new and useful is:—

1. A grass trimmer comprising in combination with a lawn mower, an attaching socket detachably and adjustably secured to the lawn mower frame, a trimmer frame detachably connected with the attaching socket, a vertical shaft journalled in the frame, a cam yoke mounted on said shaft, a cam roller carried by said yoke, means for transmitting motion from one of the wheels of the lawn mower to said vertical shaft, a cutter bar support detachably and adjustably connected with the trimmer frame, a stationary bar adjustably attached to said support, an operating lever pivoted to said support and having a bifurcated end cooperating with the cam yoke and its roller whereby said lever will be oscillated and a cutting blade adjustably connected to the operating lever.

2. A lawn trimmer comprising a frame consisting of an upright having a bearing at its upper end, integral bearing brackets projecting from the outer face of said uprights intermediate the ends thereof, a foot projecting from the lower end of said upright, said foot having a recess, a lug projecting from the outer face of the upright, a finger projecting downwardly from said lug spaced from the upright, an extension projecting upwardly from said lug parallel with the upright and spaced therefrom, said extension having a bearing, an arm projecting forwardly and upwardly from said finger, the outer end of said arm having a hole therethrough, an axle mounted in the hole in said arm, a wheel journalled on said axle adapted to coact with a wheel of a lawn mower, a gear wheel journalled on said axle and connected with the first named wheel, a shaft mounted in the bearings formed with the upright and the extension, a pinion journalled thereon meshing with the gear, a beveled gear also mounted on said shaft, a vertical shaft in the bearing bracket, a beveled gear secured thereto and meshing with the first named beveled gear, a cam yoke on said vertical shaft, a roller journalled within said yoke, a cutter bar support adapted to register with the recess in the aforementioned foot, means for holding said support in its different adjusted positions, a stationary cutter bar carried by said support, a cutting blade lever pivoted to the cutter bar support and having a bifurcated end for coaction with the cam roller whereby said lever will be oscillated, a cutter blade carried by said lever and means adapted to be adjustably attached to a lawn mower whereby the trimmer may be detachably placed in position.

3. In a device of the character stated, a cutter bar support consisting of a shank and a recessed head having a slot in the recessed portion thereof, a cutter bar provided with forwardly extending fingers which act as the fixed cutting element having a series of perforations and fastening means adapted to pass through one of the perforations and through the slot whereby the cutter bar may be adjusted relative to the support.

4. In a device of the character stated, an attaching socket provided with a slot for registration with a portion of the frame of a lawn mower and having a channel with which is adapted to register the finger of a trimmer frame, and a set screw threaded through the socket and projecting into the slot, another set screw threaded through the socket and projecting into the channel.

In testimony whereof, we have hereunto affixed our signatures.

JAMES C. JONES.
ADOLF C. KREUTZER.